United States Patent [19]

Grall

[11] Patent Number: 4,951,268
[45] Date of Patent: Aug. 21, 1990

[54] METHOD FOR THE SONAR CLASSIFICATION OF UNDERWATER OBJECTS, NOTABLY MOORED MINES

[75] Inventor: Georges Grall, Le Conquet, France

[73] Assignee: Thomson-CSF, Puteaux, France

[21] Appl. No.: 349,760

[22] Filed: May 10, 1989

[30] Foreign Application Priority Data

May 10, 1988 [FR] France .................. 88 06277

[51] Int. Cl.$^5$ .............................................. G01S 9/66
[52] U.S. Cl. ........................................ 367/88; 367/105; 367/106; 367/111
[58] Field of Search ................... 367/88, 93, 106, 107, 367/111, 113, 103, 105

[56] References Cited

U.S. PATENT DOCUMENTS

| 3,618,007 | 11/1971 | Anderson | 340/3 R |
|---|---|---|---|
| 4,030,096 | 6/1977 | Stevens et al. | 367/88 |
| 4,586,048 | 4/1986 | Downie | 343/379 |
| 4,642,801 | 2/1987 | Perny | 367/88 |
| 4,751,645 | 6/1988 | Abrams et al. | 367/88 |

FOREIGN PATENT DOCUMENTS

| 1265003 | 10/1968 | Fed. Rep. of Germany . |
|---|---|---|
| 1516621 | 5/1969 | Fed. Rep. of Germany . |
| 3219488 | 1/1983 | Fed. Rep. of Germany . |
| 1316138 | 5/1973 | United Kingdom . |

OTHER PUBLICATIONS

Ultrasonics, May 1982, pp. 107–112, Butterworth & Co. Ltd., F. K. Lam et al.

Primary Examiner—Charles T. Jordan
Assistant Examiner—J. Woodrow Eldred
Attorney, Agent, or Firm—Oblon, Spivak, McClelland, Maier & Neustadt

[57] ABSTRACT

In a sonar used to determine the characteristics of the underwater mines, the emission diagram in the vertical plane is modified to obtain two main lobes separated by a central zero value. At reception, the bearing/frequency display system shows a dark strip separated by two luminous strips. When the echo from a mine persists, in going through the dark zone, it is recognized that it pertains to a moored mine floating in the water, thus enabling moored mines to be identified and their submersion depth measured.

4 Claims, 3 Drawing Sheets

U.S. Patent  Aug. 21, 1990  Sheet 1 of 3  4,951,268
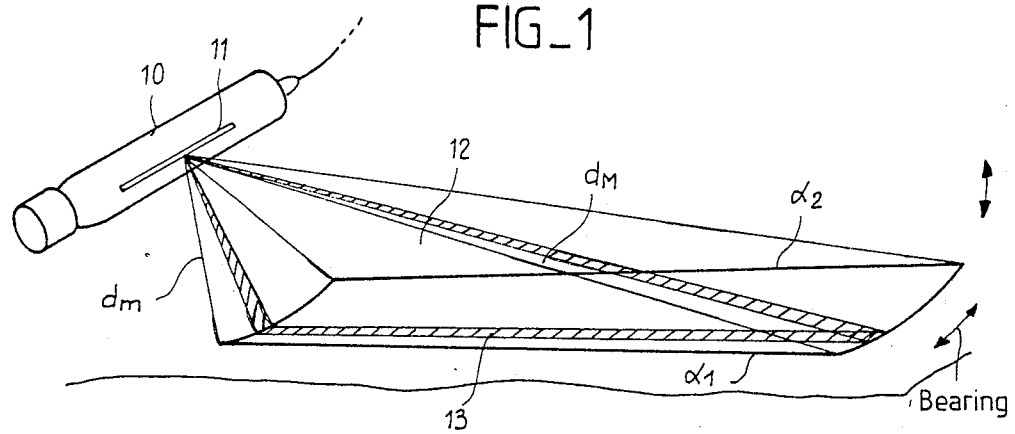
FIG_1
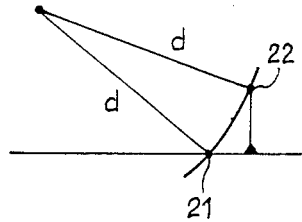
FIG_2-b
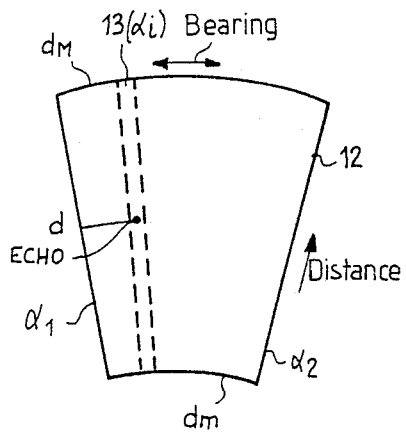
FIG_2-a
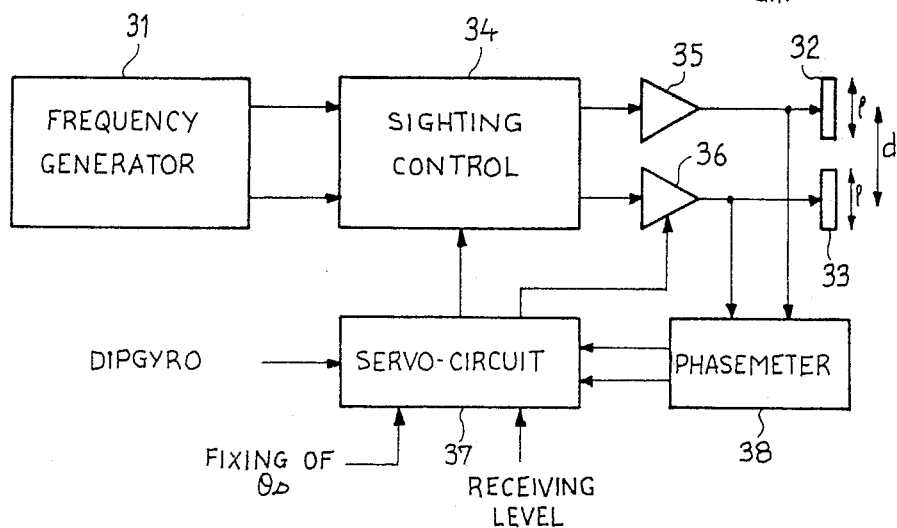
FIG_3

FIG_4
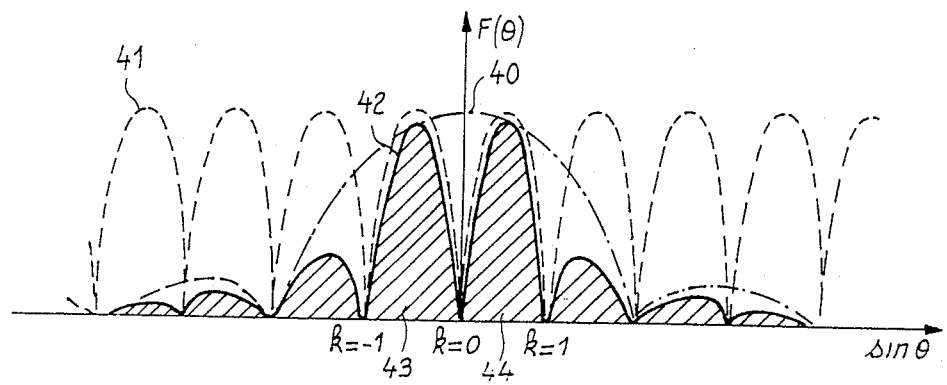
FIG_5
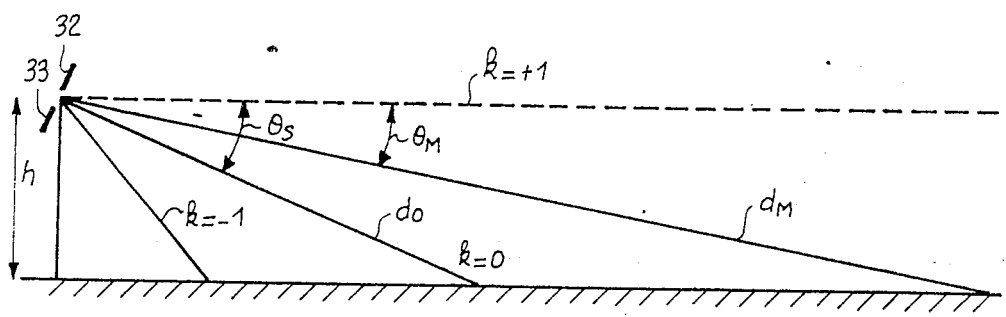

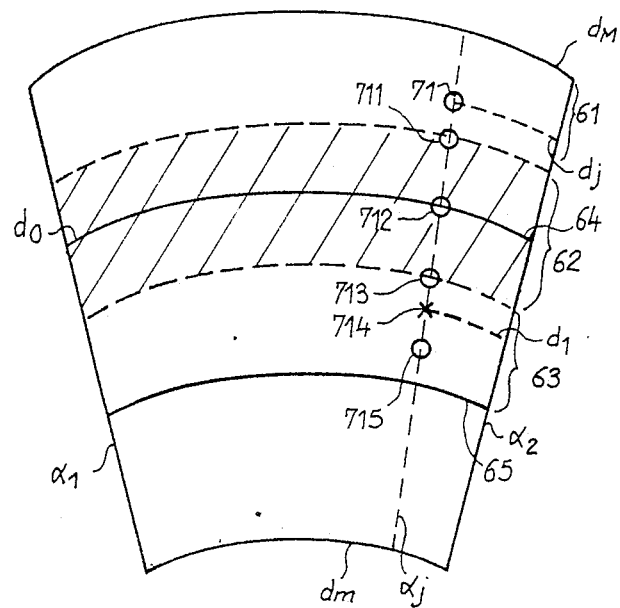
FIG_6
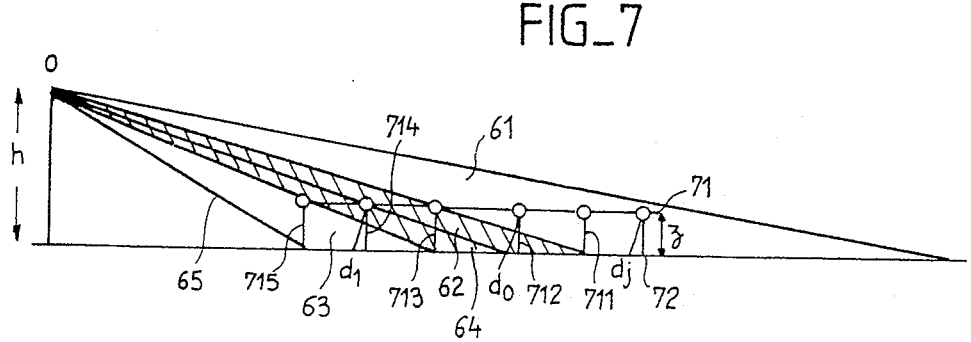
FIG_7
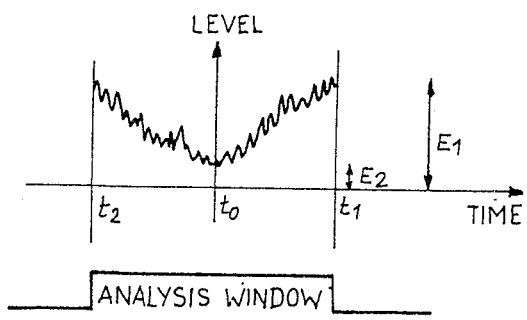
FIG_8

METHOD FOR THE SONAR CLASSIFICATION OF UNDERWATER OBJECTS, NOTABLY MOORED MINES

BACKGROUND OF THE INVENTION

1. Field of the Invention

The present invention relates to sonar mine detectors, namely sonars that enable the detection of underwater objects, that have sent back sonar echoes, through display of these echoes, and that make it possible, notably, to find out whether these objects are mines floating in the water, particularly moored mines, or mines laid on the seabed.

2. Description of the Prior Art

As is known, moored mines are mines floating within the water, in being hooked by a cable, called a mooring cable, to a mooring buoy, called a sinker, lying at the bottom of the seabed.

Mine-sweepers are commonly fitted with an active sonar which works at relatively high frequencies of several tens of kHz, to have an angular resolution compatible with the size of the mines.

The sonar is mounted either on the mine-sweeper or on a "fish" (or unmanned submarine type device) which is towed by the mine-sweeper or is self-propelled.

This sonar has an emitting antenna which diffuses sound in the marine environment to obtain uniform sound diffusion in a volume extending, for example, over 30° in bearing and 80° in dip. The sonar also has a reception antenna enabling the formation of directional channels, in bearing, to obtain the angular resolution desired according to the bearing. In thus forming, for example, as shown in FIG. 1, 100 channels such as 13, with an angle width of 0.3°, it is possible to cover an sound-diffused angle sector equal to 30°.

FIG. 1 shows the volume sound-diffused from a sonar mounted on a "fish". It corresponds to an observation zone 12 demarcated, in bearing, by the angles $\alpha_1$ and $\alpha_2$ and, in distance, by the distances $d_M$ and $d_m$. Of these distances, $d_M$ corresponds to the maximum range beyond which the echo becomes too weak and $d_m$ corresponds to a distance close to the height of water between the "fish" and the seabed. The seabed is sound-diffused flatly.

The FIG. 2a shows the zone 12 explored by the sonar as can be seen on the display screen of this sonar in mode B (bearing-distance). Each channel, such as 13, corresponds to an angle between and $\alpha_i$, between $\alpha_1$ and $\alpha_2$, and is represented by a strip shown enlarged in FIG. 2 for the requirements of the drawing. Every echo detected within the channel 13 will be represented, on the corresponding strip on the display screen, by a bright dot. This bright dot will appear on a less luminous background at a distance d, irrespectively of its height over the seabed. It follows that it cannot be ascertained, as shown in FIG. 2b, whether the echo corresponds to a mine 21 laid on the seabed or to a moored mine 22.

To make it possible to distinguish between echos corresponding to objects laid on the seabed and those corresponding to objects floating in the water, the invention proposes to modify the dip emission diagram of the sonar to obtain two main lobes separated by a zero value located in the field of observation of the sonar. A dark zone is obtained on the display screen, corresponding to the oblique distance from the zero value. When an object is located on the seabed at this distance, the echo corresponding to this object disappears in the dark zone, whereas when there is an object floating in the water, at the same oblique distance, the echo remains and its contrast increases, with respect to the dark zone into which it passes, enabling the operator to classify the object.

BRIEF DESCRIPTION OF THE DRAWINGS

Other features and advantages of the invention will emerge clearly from the following description, made with reference to the appended figures, of which:

1 FIG. 1 stows a cavalier projection of the sector of observation sound-diffused by a sonar borne by a "fish";

FIGS. 2a and 2b are explanatory diagrams of the display of objects by this sonar;

FIG. 3 is a block diagram of the emitter of a sonar according to the invention;

FIG. 4 is the emission diagram of a sonar according to the invention;

FIG. 5 is a diagram, in the vertical plane, of the diffusion of sound on the seabed by a sonar according to the invention;

FIG. 6 shows the screen of the sonar of FIGS. 4, 5 and 7;

FIG. 7 is a simplified representation of the diagram of FIG. 5, wherein a moored mine is seen; and FIG. 8 shows a timing diagram of the reception signal of the sonar according to the invention.

DESCRIPTION OF PREFERRED EMBODIMENTS

FIG. 3 shows the block diagram of a sonar transmitter enabling the implementation of the invention.

A frequency generator 31 makes it possible to obtain the working frequency of the emission antenna of the sonar. This frequency is applied to two rows of transducers 32 and 33 by means of a sighting control device 34, the role of which shall be explained further below, and two amplifiers 35 and 36. These transducers have a height 1, and have a distance d between them.

The two rows, respectively containing the transducers 32 and 33, are parallel to the seabed. In a vertical plane perpendicular to the plane of these two rows, an angle $\theta$ is defined, taken with reference to the perpendicular to the plane of the two rows.

If $\lambda$ is the wavelength corresponding to the central emission frequency, the function of directivity $F(\theta)$ as a function of $\theta$, namely, the amplitude of the signal emitted as a function of this angle, is given by the formula:

$$F(\theta) = \frac{\sin(\pi 1\, \sin\theta/\lambda)}{\pi 1\, \sin\theta/\lambda} \cdot \sin(\pi d\, \sin\theta/\lambda)$$

FIG. 4 shows the function $F(\theta)$ (on the Y axis) as a function of $\sin(\theta)$ (on the X axis) namely the emission diagram of the sonar. $F(\theta)$ corresponds to the curve 42 demarcating a hatched zone, and represents the product of the inherent directivity of each row of transducers, represented by the curve 40 in dots and dashes, by $\sin(\pi d.\sin\theta/\lambda)$. It is observed, according to a known result, that this function $F(\theta)$ has zero values in the directions $\theta_z$ such that: $\sin\theta_z = \pm k\lambda/d$ with k being a positive whole number.

FIG. 4 corresponds to the particular case where d = 21. It is observed that there are main lobes surrounding a central zero value corresponding to k=0. These lobes are demarcated by two first zero values, one positive for k=+1 and the other negative for k=−1. Of course, there is a succession of side lobes of lower level. FIG. 5 shows a view of the sea environment and the seabed, taken in a vertical plane going through the middle of the emitting antenna 33. The antenna is inclined towards the seabed in such a way that direction perpendicular to the plane of the antenna, corresponding to the central zero value (k=0) is inclined by an angle $\theta_s$, with respect to the horizontal, which is greater than the angle $\theta_M$ corresponding to the maximum distance $d_M$ (range).

The geometry of the system and, notably, the distance d between the two rows of transducers 32 and 33 is determined as a function of the operational conditions of the system: range $d_M$, height h and emission frequency.

These conditions are, by way of example:
h=50 m.
$d_M$≈1000 m.
emission frequency=100 kHz.

An angle $\theta_s$ is chosen such that the sonar/seabed distance $d_o$ in the direction of the zero value is close to 500 m, i.e. $\theta_s$=5.75°.

To obtain satisfactory sound diffusion, such that the higher zero value k equals +1 is more or less horizontal, we choose d=10λ, that is, l=5λ. The value of $\lambda_d$ is close to $\theta_s$.

The distance d is thus equal to about 15 cm. This is quite compatible with the space factor requirements on a towed "fish".

Because the sonar-carrier vehicle is subjected to motions (roll, pitch etc.) the dip emission beams have to be stabilized with respect to the seabed.

This is obtained by the sighting control device 34 shown in FIG. 3. This device works by controlling the phase of the signals given by the generator 31 under the control of a servo-circuit 37. This servo-circuit works by comparing the phase deviation signals at output of the amplifier 35 and 36, defined by a phasemeter 38 with respect to a fixed or set value $\theta_s$, and according to the indications given by a dip gyrometer which measures the trim or inclination with respect to the horizontal) of the sonar.

Thus, the apparent tilt of the antenna is modified electronically, while at the same time leaving this antenna mechanically fixed.

In view of the existence of the central zero value, there is thus a poorly sound-diffused zone between the two lobes 44 and 45, which the operator will use so that he can distinguish a moored mine from a mine laid on the seabed.

FIG. 6 shows the display screen of the sonar. On this screen, the depiction is similar to that of FIG. 2, allowing for differences in sound diffusion. The depiction of the sound-diffused space thus takes the form of a ring segment demarcated by the two arcs of circles corresponding to $d_M$ and $d_m$, and by two portions of radii corresponding to the limit angles, in bearing, $\alpha_1$ and $\alpha_2$.

a first zone 61 which corresponds to the reverberation, from the seabed, of the acoustic signal received in the lobe 44. It has a brilliance that shall be called "normal".

a dark zone 62, for which there is little reverberation, since there is little sound diffusion, with a black line 64 in its middle, said black line 64 corresponding to the main zero value;

a third zone 63 corresponding to the reverberation, from the seabed, of an acoustic signal received in the lobe 45. This zone has a brilliance similar to that of the zone 61; it ends in a dark zone followed by a black line 65 corresponding to the lower zero value.

When there are objects in the sound-diffused volume that send echos back towards the sonar, these echos are represented by bright dots on the surface of the screen, but these dots are identified, as was seen above, only by their bearing and their distance, and this mode depiction does not make it possible to ascertain whether the object is floating within the water, or whether it is laid on the seabed.

FIG. 7 thus shows a mine 71, floating within the water at a height z, being held by a mooring line which is at a point 72 on the seabed. The echo produced by this mine is shown in FIG. 6, where it is seen that it is in a bearing $\alpha_j$, which is accurate, and the distance $d_j$, which is itself also accurate, but it is not known if this echo is a moored mine at $d_j$ or else a mine laid on the seabed at $d_j$, since this distance $d_j$ corresponds to all the points of an arc of a circle with a diameter $d_j$, centered on the phase center 0 of the antenna, located in the vertical plane of FIG. 7.

As and when the sonar goes forward, the echo goes through the zone 61 and, when it reaches the boundary between this zone and the dark zone 62, i.e. at the position 711 in FIG. 7, this echo does not get weaker in penetrating this zone 62 since it stays in the lobe 44. On the contrary, the apparent contrast, between the echo and the luminosity of the zone where it is, begins to increase since the zone 62 is darker than the zone 61.

As and when the ship goes forward, the echo goes through the dark zone 62 and then, when the mine reaches the distance $d_o$, 712, it goes through the black line 64 and there is a sharp increase in its apparent contrast. The operator monitoring the display screen comes to the conclusion that he is in the presence of an object floating in the water. If, in addition, this echo is immobile, there is a great chance that it is a moored mine.

When the mine reaches the position 713, which is at the limit of the zone sound-diffused by the lobe 44, the echo starts disappearing from the screen.

Then the echo disappears completely when the mine is in the position 714 at the distance $d_1$ in the direction of the zero value.

When the mine reaches the position 715, corresponding to re-entry in the lobe 45, the echo reappears.

According to the invention, the operator can determine the height at which the mine floats above the bed, making use of the two instants when, respectively, the mine crosses the black line 64, and when it disappears.

To this end, the operator measures the time interval between these two instants. This gives the distance ΔX travelled by the sonar. By simple application of the elementary rules of geometry, the height z is given by $z = h \times \Delta X_{X_o}$ with:

$$X_o = (D^2_o - h^2)^{\frac{1}{2}}$$

According to an alternative mode of operation, when the operator has a sighting control for the antenna of the sonar, he can immediately obtain the height of the mine by performing two operations for sighting the zero value, the sonar being immobile:

a first sighting in the direction that makes the echo go on the black line 64;

a second sighting that makes the echo disappear.

These two successive sighting operations enable z to be obtained immediately, without waiting for the natural disappearance of the echo owing to the progress of the sonar.

Experiments have shown that, taking into account the alertness of the operator as well as the speed with which the echo moves across the screen, the contrast between the echo and the reverberation should generally be at least equal to 10 dB in crossing the black line 64.

In fact, this black line 64 is not totally black, because of the phase jitter in the phase stabilization loop seen in FIG. 3, which causes a certain degree of sound diffusion of the seabed in the zone corresponding to the central zero value. This phase jitter should therefore not lead to any great lack of precision in the sighting of the zero value, which would then be poorly stabilized, and the 10 dB of contrast would not be maintained. Experience has shown that, by using quite usual technology to make the emitter of a sonar of this type, this constraint on the phase jitter is broadly met.

Besides, the zero values, especially the central zero value, are never totally null, owing to various points of imprecision in the parameters that define the system. Among these parameters, the most important one is the equality of the levels of emission on each transducer. Thus, a difference of 1 dB between the levels of emission of these transducers results in the fact that the level of emission in the direction of the main zero value does not go below −20 dB with respect to the maximum level of the two main lobes. This phenomenon too restricts the varation in contrast of the echo when going through the dark zone, and it should be reduced to the minimum.

For this, it is possible, for example, to introduce a variable gain control into at least one of the amplifiers 35 and 36. This variable gain could be controlled by directly measuring the output levels of these amplifiers, but the precision with respect to the final result would be low. It is therefore preferred to make a direct measurement of the result to be obtained, namely the difference in level between the signals received in the direction of the peaks of the main lobes and those received in the direction of the central zero value.

Referring to FIG. 8, the upper diagram represents the reception level as a function of the time and the lower diagram represents the window of analysis during which the received signal is effectively processed by the receiver.

The curve representing this level is substantially V-shaped between the instant of opening $t_1$ and the instant of closure $t_2$, with a minimum at the instant $t_0$ corresponding to the passage through the central zero. The maximum and minimum levels are respectively $E_1$ and $E_2$, and the method consists in measuring this ratio $E_1/E_2$ and in adjusting the gain of the amplifier provided with an adjusting means, so as to maximize this ratio. For this purpose, in a known way, the method uses algorithms that converge at the end of about ten recurrences of the sonar. In one preferred embodiment, the phase servo-circuit is made digitally in the circuit 37, thus enabling the use of these circuits also to implement the servo-control of the output amplifiers in amplitude.

The system according to the invention also works when the emissions are frequency modulated in order to achieve pulse compression processing at reception.

When the sonar is borne by a "fish", the greater the submersion I of this "fish", the less will the upper lobe 4 be inclined to the horizontal. From a certain level of submersion onwards, a portion of this lobe is pointed towards the surface of the water, thus causing a reverberation of the sonar signals on this surface. The signals then sent back by those positions of the surface that are located at the distance $d_o$ restrict the variation in echo/seabed reverberation, which may thus become undetectable.

To overcome this drawback, the invention proposes the creation of a second main zero value in the direction of the surface corresponding to this distance $d_o$, given by Arc sin $d_o^I$, in using a so-called adaptive antenna having, for example, three rows of transducers, taking into account the following constraints:

the level in the direction of the mine at the distance $d_o$ is standardized; and the echos for which the period of which is known are removed by a window with holes to minimize the reverberation signals at the distance $d_o$.

The system according to the invention can be used permanently or at the operator's request when a suspicious echo is detected during a standard emission where, for example, only one of the two transducers is used, or when these two transducers are powered according to a phase relationship which gives a single lobe similar to that used in the prior art.

What is claimed is:

1. A method for the sonar classification of underwater objects such as moored mines, wherein sound emitted from a sonar travelling across the sea at a height H is diffused in a predetermined underwater sector having a vertical plane, wherein echos are sent back by seabed and by objects floating in water and wherein said echos are displayed according to a bearing and distance mode, wherein said sector is sound-diffused according to a diagram having, in said vertical plane, two emission lobes separated by a central zero value, said second-diffusion providing a display of a dark zone surrounded by two luminous zones, whereby the objects floating in the water are distinguished from objects lying on the seabed by the fact that the display echo of an object floating in the water remains when the displayed echo travels from one of said luminous zones to said dark zone and the display echo of an object laid on the seabed disappears when said display of said object goes from one of said luminous zones to said dark zones, and wherein, in order to measure the height Z of the object floating in the water, the displayed echo from said floating object crossing at a first instance a black zone located substantially in the center of the dark zone and corresponding to a distance Do from the sonar to the seabed, and said displayed echo disappearing later at a second instance, measurement is made of a distance ΔX travelled by the sonar between said two instants and said height Z is given by the formula:

$$z = h \, \Delta X/((do)^2 - h^2)^{0.05}.$$

2. A method according to claim 1, wherein the height z is obtained by successively performing a first sighting in the direction where the object would be if it were lying on the seabed, corresponding to the passage of the echo through a dark zone, and a second sighting that makes the echo from this object disappear, the sonar being immobile.

3. A method for the sonar classification of underwater objects such a moored mines, wherein sound emitted from a sonar transmitter travelling across the sea at a height H is diffused in a predetermined underwater sector having a vertical plane and wherein echos are sent back from the seabed and from objects floating in water wherein said echos are displayed according to a bearing and distance mode and wherein said sector is sounddiffused according to a diagram having, in said vertical plane, two emission lobes separated by a central zero value, said diffused area providing a display of a dark zone surrounded by two luminous zones, the object floating in the water being distinguished from objects laid on the seabed by the fact that the displayed echo of an object floating in the water remains when the displayed echo goes from one of the luminous zones to the dark zone and also characterized by the fact that the displayed of an object laid on the seabed disappears when the displayed object goes from one of the luminous zones to the dark zone, and wherein two substantially identical acoustic signals are emitted from two distinct transducers to obtain a diagram of interference of said emissions producing at least two main lobes separated by a central zero value, and wherein, echos are received with an amplitude varying between a maximum value $E1$ and a minimum value $E2$ and said central value corresponding to a residual level of the emitted acoustic signals, said residual level being reduced to a minimum value by measuring the ratio $E1/E2$ and by adjusting the amplitude of said acoustic signals emitted by said transducers so as to minimize said ratio $E1/E2$.

4. A method for the sonar classification of underwater objects such as moored mines, wherein sound emitted from a sonar transmitter travelling across the sea at a height $H$ is diffused in a predetermined underwater sector having a vertical plane and wherein echos are sent back from the seabed and objects floating in water wherein said echos are displayed according to a bearing and distance mode and wherein said sector is sound-diffused according to a diagram having, in said vertical plane two emission lobes separated by a central zero value wherein said sound-diffusion leads to the display of a dark zone surrounded by two luminous zones and wherein the objects floating in the water are distinguished from objects laid on the seabed by the fact that the displayed echo of an object floating in water remains when said echo goes from one of said luminous zones to said dark zone and wherein the displayed echo of an object laid on the seabed disappears when the displayed echo goes from one of the luminous zones to said dark zone, and wherein said emitted sound is frequency modulated and wherein received signals are pulse compressed.

* * * * *